United States Patent [19]

Hankins et al.

[11] Patent Number: 4,566,192
[45] Date of Patent: Jan. 28, 1986

[54] CRITICAL DIMENSION MEASUREMENT STRUCTURE

[75] Inventors: Kevin T. Hankins; Anthony L. Rivoli, both of Palm Bay, Fla.

[73] Assignee: Harris Corporation, Melbourne, Fla.

[21] Appl. No.: 566,399

[22] Filed: Dec. 28, 1983

[51] Int. Cl.⁴ .............................................. G01B 5/00
[52] U.S. Cl. ........................................ 33/1 B; 33/547; 33/533
[58] Field of Search ............................ 237/1 B, 174 G

[56] References Cited

U.S. PATENT DOCUMENTS

| | | |
|---|---|---|
| 830,282 | 9/1906 | Andrews ............................... 33/1 B |
| 3,861,798 | 1/1975 | Kobayashi et al. . |
| 4,050,821 | 9/1977 | Cuthbert et al. . |
| 4,183,659 | 1/1980 | Brunner . |
| 4,288,157 | 9/1981 | Brunner . |
| 4,309,813 | 1/1982 | Hull . |
| 4,475,288 | 10/1984 | Pellegrom ............................ 33/1 B |

*Primary Examiner*—Robert I. Smith
*Attorney, Agent, or Firm*—Barnes & Thornburg

[57] ABSTRACT

A pattern for determining dimensions of projected or printed figures is provided having individual scaling figures therein on a mask or template. Dimensional measurement may be indicated by alignment of opposing edges of scaling figures offset from each other along the corresponding axis of alignment. Reference marks may be provided on the pattern and associated with each possible axis of alignment for indicating an absolute dimension of a concurrently projected or printed figure. To conserve space, the pattern may be "densepacked" with scaling figures such that each scaling figure includes a plurality of opposing edges, each alignable along a different axis in response to different levels of dimensional distortion.

23 Claims, 2 Drawing Figures

CRITICAL DIMENSION MEASUREMENT STRUCTURE

BACKGROUND AND SUMMARY OF THE INVENTION

The present invention relates generally to mask or template printing and, more particularly, to means for determining the dimensions of figures printed on semiconductor wafers.

In the fabrication of integrated circuits, a mask of known dimensional accuracy may typically be employed to project or print a pattern repetitiously onto a semiconductor wafer by photographic, X-ray, or electron beam techniques. It is often important that the resulting pattern size have a particular accuracy, i.e., that the absolute dimensions of figures in that pattern be known and within a given dimensional range for each such printed or projected pattern. For example, certain pattern dimensions or linewidths, such as apertures or MOS gate electrodes, are critical during production of integrated circuits (ICs).

Betwen the mask and mask making machines and between the mask and semiconductor wafer there may typically be zero magnification error or perfect pitch with respect to well calibrated, state-of-the-art projection alignment optics equipment itself. However, dimensional variation of projected figures may be caused by a number of other factors in the printing or projecting processes, including variations in light intensity, photoresist thickness, exposure time, numerical aperture and developing time and temperature. For example, the resulting exposed portion of a photoresist pattern may have a greater linewidth than the corresponding mask slot. This may be caused by "shadowing" during printing. Subsequent IC fabrication processes, such as etching, may increase this dimensional variation by undercutting.

Several means have previously been used to calibrate or measure the dimension of such resulting patterns. However, none of these provide an absolute measure of dimensions. Measurement masks or slides of low temperature coefficient glass material may be registered with the National Bureau of Standards, but are not truly absolute in practice and are subject at at least some variation caused by thermal expansion or contraction in periods between recalibration. Recalibration of the measurement tool from such slides over periods of time is not exactly repeatable; an average of several sets of measurements is typically employed. Further, such measurement tools also leave repetition inaccuracies at any given point in time and are subject to drift or perturbation from the last previous calibration.

Another problem with prior direct measurement devices is that automatic camera-sight type machines may be unable to detect some critical dimensions directly, since they have limited resolution of such features as apertures or metal. This problem may also arise with prior concurrent distortion scale patterns which are printed onto masks, photoresists, and/or semiconductor wafers along with the desired circuitry. Such an arrangement of scale patterns is shown, for example, in U.S. Pat. No. 4,288,157, issued to Brunner. These scale patterns also do not readily allow for measurement of dimensional decreases and may require complex, expensive density detection equipment. Further, such scale patterns may not be easily and efficiently printable to show extremely fine dimensional variations.

It is therefore an object of the present invention to provide a means for ensuring the dimensions of projected or printed figures.

Another object is the provision of a means to detect and measure the dimensional variation of printed figures caused during the printing process.

A further object is to provide an absolute measure of linewidth of figures projected onto semiconductor wafers or wafer masks.

Still another object is the provision of a means for preventing calibration and drift errors in the measurement of dimensions of a series of reproduced figures.

Yet still another object is to provide a means for measuring critical dimensions in a series of repetitiously printed figures by means of relatively inexpensive electrical or optical equipment.

These and other objects of the present invention are attained in the provision of a pattern means, coded onto a mask or template, for scaling of dimensional variation of figures projected from that mask onto a lower or projected surface, such as a semiconductor wafer. This pattern means includes a plurality of individual, spaced scaling figures which are arranged such that the alignment of opposing edges of at least two of these scaling figures, which are laterally offset from each other along the axis of edge alignment on the projected surface, will represent a measure of the dimensional variation caused during the projecting or printing process. This dimensional variation may be correlated to the absolute dimension of critical features, such as linewidth, and indicia representing this correlation may be included within the pattern means along the corresponding alignment axis.

Alignment of opposing edges of scaling figures may be detected by electrical edge discriminating equipment or an optical microscope having a hairline eyepiece. Scaling figures may be arranged into columns with one member of each set of aligning scaling figures in each column. Alignment detection using an optical microscope would employ the hairline as an alignment axis and determine dimensional measurement by finding which row of scaling figures in the columns has scaling figures whose opposite edges line up on the hairline. An indicia of absolute dimension associated with that row may be directly observable under the microscope.

Since dimensional variation of figures during the printing or projecting process is usually a constant value in a given instance, only measurements along a single alignment axis are necessary in most cases. Further, the pattern means described may be used as a measurement means in formation of the mask, photoresist surface, and/or the permanent wafer pattern since it is projected along with the desired circuitry and is subject to concurrent distortion therewith. To conserve space, the individual scaling figures may be formed with a plurality of opposing edges and arranged such that each scaling figure forms part of a plurality of sets of aligning scaling figures.

Other objects, advantages, and novel features of the present invention will be readily apparent from the following detailed description of the invention when considered in conjunction with the accompanying drawings.

DETAILED DESCRIPTION OF THE DRAWINGS

Figure 1:
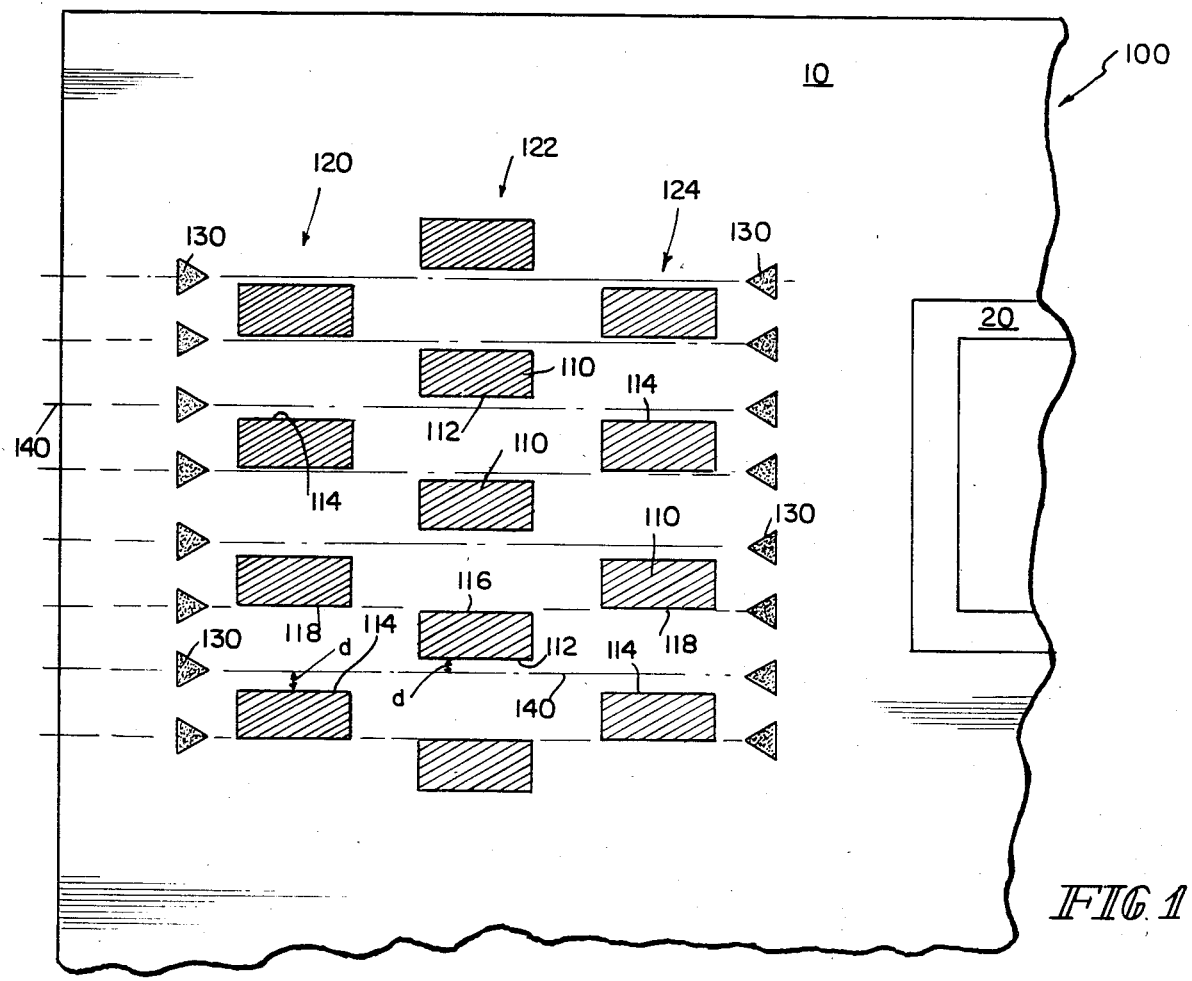
FIG. 1 is a plan view of a dimensional measurement pattern means on a mask according to the principles of the present invention.

FIG. 1, which illustrates a preferred embodiment of the present invention, shows a pattern means of 100 as coded on mask or template means 10 for projection onto another surface for printing or photographic reproduction. Mask 10 may include a variety of other figures thereon for projecting or printing onto another surface. Features 20, for example, represent a portion of a circuit to be printed on a semiconductor chip. Typically, this mask will be repetitiously employed for printing a plurality of similar figures, as in chip fabrication on a semiconductor wafer. Pattern means 100 may thus be repeated within each such chip and may be used to measure dimensions of features 20 in that chip.

Pattern means 100 includes a plurality of individual scaling figures 110 therein. Scaling figures 110 are spaced apart and, for example, are arranged into columns 120, 122, and 124 as shown. Each scaling figure 110 has at least one edge 112 which opposes at least one edge 114 of another scaling figure offset into a different column. Each set of such opposing-edged scaling figures 110 includes at least two scaling figures that are offset laterally from each other along a corresponding alignment axis 140 extending from reference marks 130. When subject to a particular level of dimensional distortion during the printing or projecting process, these opposing edges become aligned along a particular corresponding axis of alignment 140.

In an especially preferred embodiment of the present invention, each set of scaling figures corresponds to a different measure of dimensional distortion variation. While the spacing between scaling figures 110 in a particular column and the dimension or width of those figures is, for example, a constant or given coded value, the orthogonal distance d of an undistorted opposing edge from the alignment axes 140 varies with each set of scaling figures. This distance d represents the amount of dimensional variation or distortion necessary for a particular set of opposing edges 112 and 114 to become aligned along their corresponding alignment axis 140. If the dimensional distortion is greater or less than that predetermined amount, their opposing edges will not be aligned. Where a plurality of sets of scaling figures is employed, a variety of distances d can be established so that opposing edge alignment may be achieved for a variety of dimensional distortion levels. For applications where dimensional distortion causes enlargement, the values of d may be positive, i.e., the opposing edges of scaling figures in a given set are spread apart from the alignment axis. For applications where dimensional distortion causes shrinkage, the value of d may be negative, i.e., the opposing edges of scaling figures in a given set on a mask overlap the alignment axis.

Since for each set of scaling figures in pattern means 100 the original coded dimensions of each scaling figure and the associated dimensional distortion d can be known, an absolute dimensional measurement may be obtained for dimensions, such as linewidths, of the features 20 also projected from mask 10 whose original dimensions are known. All figures projected from mask 10 are typically subject to distortion concurrently. Thus, once the distortion of the scaling figures is determined by examining pattern means 100 to detect which set of scaling figures has its opposing edges aligned, the distortion of features 20 can also be known.

Each reference mark 130 in pattern means 100 may correspond to a particular level of distortion. This level of distortion may be determined, for example, by reference to the specification for that pattern means or by a given standard if the distortion level per reference mark is standardized in a particular embodiment of the present invention. As shown, for example, in the embodiment of FIG. 1, if the original coded critical dimension of features 20 is 2.50 units, then it has been found to be advantageous to position each of reference marks 130 such that they correspond to similar dimensional units indicating dimensions about that critical dimension when subject to various degrees of distortion. In the example mentioned above, the uppermost pair of reference marks 130 at the side of columns 120 and 124 correspond to 3.50 units. The next lower pair of reference marks 130 at the side of columns 120 and 124 correspond to 3.25 units, then 3.75, 3.00, 4.00, 2.75, 4.25, and 2.50 units, respectively, down to the lowermost pair of reference marks. This particular format of distortion level indicators is particularly advantageous in the densely packed embodiment of the present invention referred to below. Thus, once the particular set of scaling figures whose opposing edges are aligned is determined, the critical dimension of features 20 may be read off pattern means 100 directly. To the extent that the dimensions of the original coding of pattern means 100 on mask 10 are known absolutely, the projected critical dimension of features 20 may thus also be known absolutely. Calibration and drift errors are thereby avoided with the present invention.

Figure 2:
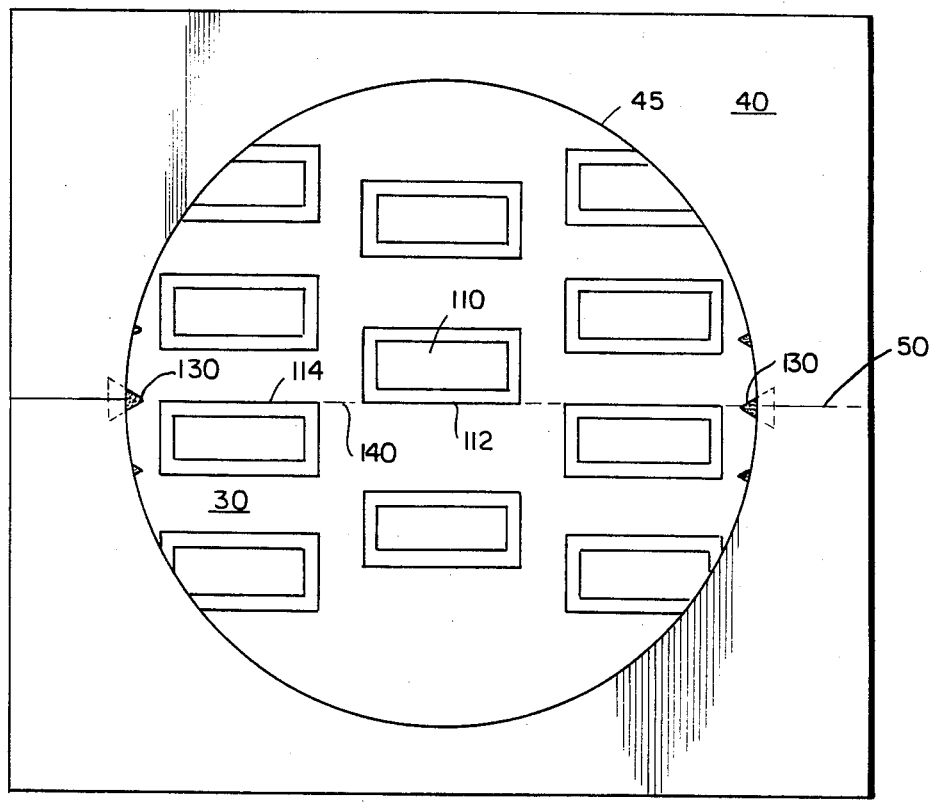
FIG. 2 is a plan view of the pattern of FIG. 1 projected onto a surface and viewed through an eyepiece.

FIG. 2 illustrates a portion of pattern means 100 as projected from mask 10 onto semiconductor wafer means 30 and viewed through eyepiece 45 of an alignment detector means 40. Shadowing about each of scaling figures 110 is indicative of dimensional distortion resulting from the projection onto wafer 30. To determine the dimension of a projected linewidth of features 20 (not shown in FIG. 2), detector means 40 examines each set of scaling figures 110 to determine alignment of opposing edges 112 and 114. Detector means 40 is, for example, an optical detector such as a microscope, or an electronic edge detector. If detector means 40 is an optical device, such alignment along an axis 140 may be determined by a crosshair 50, as shown in FIG. 2. Reference marks 130 indicating absolute dimension for alignment along a particular axis 140, can be noted directly through eyepiece 45.

Since the dimensional variation caused by projecting or printing from mask 10 is usually a constant for all dimensions in a given instance, it is only necessary to detect alignment along a single axis in order to determine every dimension of each projected figure. While a generally horizontal axis has been selected in the above described embodiments, the present invention contemplates the use of any other convenient axis or set of axes for this purpose. Further, although three columns, 120, 122, and 124 are illustrated in the above figures, such that each set of scaling figures has three scaling figures in that set, it is only necessary for alignment purposes to have two scaling figures in each set. Indeed, even the columnar arrangment of such sets is not necessary if there are not spacial constraints on the mask or template.

If there are critical spacial constraints on the mask, a densely packed arrangement in pattern means 100 may be provided by supplying each scaling figure 110 with a plurality of opposing edges, each of which edges corresponds to a different set of scaling figures having different d values and alignment axes 140. In the example of FIG. 1, scaling figure 110 may also have edge 116 which opposes edge 118 on another scaling figure offset into a different column. Thus, scaling figure 110 is an element of two different sets of scaling figures, according to whether edge 112 or 116 is being aligned.

In general, scaling figures 110 may be of any size or configuration. The only practical constraints are that a given scaling figure should be repeated at least twice in a given set such that opposing edges are present. It is also suggested that each scaling figure have symmetry about an axis orthogonal to its corresponding alignment axis so that the opposing edges are similar. In an especially preferred embodiment, scaling figures 110 are metalized lines or spacings between lines. The scaling figures of the present invention may be used to determine dimensions and dimensional variations on masks, photoresists, or permanent wafer patterns as well as any other photographic/printing surface. The same set of scaling figures may be used to indicate distortion or dimensional variations of figures during formation of the masks and in printing from that mask onto a semiconductor wafer. If, for example, the mask pattern is created by a mask electron beam controlled by a computer matte of the mask and then subject to an etching process, the same "shadowing" effect can result on the mask as happens during the subsequent etching of the wafer following printing from that mask. In general, it is usually advantageous to place the original pattern means on that mask or screen level which most effects the critical dimension of projected figures.

From the preceeding description of the preferred embodiment, it is evident that the objects of the present invention are attained. Although this invention has been described and illustrated above in detail, it is to be clearly understood that the same is by way of illustration and example only and is not to be taken by way of limitation. The spirit and scope of this invention are to be limited only by the terms of the appended claims.

What is claimed is:

1. An apparatus for indicating dimensions of projected figures, comprising pattern means, disposed on a mask means for producing projected figures, for scaling dimensional variation of said projected figures from the dimensions of figures on said mask means, said pattern means including a plurality of spaced scaling figures disposed within said pattern means such that alignment of opposing edges of at least two of said scaling figures after projection from said mask means represents a measure of said dimensional variation, said aligning opposing edges scaling figures being offset from each other along the axis of alignment.

2. An apparatus according to claim 1 wherein said pattern means includes a plurality of sets of aligning scaling figures and wherein said scaling figures are arranged into at least two columns transverse to said alignment axis such that each scaling figure of each of said sets of aligning scaling figures is disposed in a separate column from the other scaling figures of that set.

3. The apparatus according to claim 2 wherein said scaling figures are arranged into three adjacent columns, wherein each of said sets of aligning scaling figures includes three scaling figures, and wherein the corresponding scaling figures in the outside columns both may be aligned with the same opposing edge to the corresponding scaling figure in the central column of each of said sets to represent a measure of said dimensional variation.

4. The apparatus according to claim 1 wherein said mask means is the critical dimension affecting level in the projection of figures onto a printed medium, and wherein said pattern means further includes indicia associated with each set of said aligning scaling figures which indicates an absolute dimension of said projected figures when said opposing edges of scaling figures in that set are aligned.

5. The apparatus according to claim 4 wherein said absolute dimension corresponds to the linewidth of said projected figures, and wherein said linewidth is the critical dimension of said projected figures.

6. The apparatus according to claim 1 including electronic edge finding means for detecting said alignment of said scaling figures.

7. The apparatus according to claim 1 including optical edge finding means for detecting said alignment of said scaling figures.

8. The apparatus according to claim 1 wherein each of said scaling figures in a set of said aligning scaling figures has the same configuration as the other scaling figures in that set, and wherein each of said scaling figures has symmetry about an axis perpendicular to said axis of alignment.

9. The apparatus according to claim 8 wherein each of said scaling figures is rectilinear in configuration.

10. The apparatus according to claim 1 wherein said alignment of opposing edges of said scaling figures is taken along a horizontal axis for each set of said aligning scaling figures.

11. The apparatus according to claim 1 wherein each of said scaling figures may be aligned along a plurality of different edges with a corresponding plurality of different opposing edges.

12. The apparatus according to claim 11 wherein said plurality of different edges of each said scaling figures includes two parallel edges which may each be aligned with different opposing edges such that each of said scaling figures forms part of at least two different sets of said aligning scaling figures.

13. A dimensional measurement means for use in semiconductor fabrication apparatus, formed on the screen level which effects a critical dimension of printed screen features and which is subject to inaccuracies in printing which cause dimensional variation between said screen features and features printed from said screen, comprising:

pattern means subject to concurrent dimensional distortion along with said screen figures during printing onto the projected surface means, said pattern means including at least one set of scaling figures spacially offset along a common axis whose alignment of opposing edges along said common axis represents a measure of said dimensional distortion; and means to detect alignment of said opposing edges along said common axis.

14. The apparatus according to claim 13 wherein said pattern means includes scaling figures each forming a line on said projected surface means.

15. The apparatus according to claim 13 wherein said pattern means includes scaling figures each forming a space on said projected surface means.

16. The apparatus according to claim 13 wherein said projected surface means is a mask for exposing a photoresist on a semiconductor wafer.

17. The apparatus according to claim 13 wherein said projected surface means is photoresist on a semiconductor wafer.

18. The apparatus according to claim 13 wherein said projected surface means is a permanent semiconductor wafer pattern.

19. A method for determining dimensions of printed or projected figures comprising:
projecting a pattern means onto the printed surface concurrently with the desired printed figures, said pattern means including at least one set of scaling figures arranged such that a predetermined level of dimensional distortion of said scaling figures causes alignment of opposing edges thereof, said scaling figures within said set being arranged such that said opposing edges are offset along the axis of alignment;
detecting the alignment of said opposing edges along said axis of alignment; and
correlating said predetermined level of dimensional distortion, as determined by said alignment, with the known dimensions prior to said projection to determine absolute dimensions of said projected figures.

20. The method according to claim 19 wherein said pattern means includes a plurality of said sets of scaling figures; and each of said sets has indicia associated therewith which is projected onto said printed surface along with said sets and which serves to indicate said absolute dimension for that predetermined level of distortion associated with each set of said sets.

21. An apparatus for indicating the scale of dimensional variation of figures during a printing or projection process of comprising a pattern means disposed on a screen means for producing projected or printed figures, said pattern means including a plurality of spaced apart scaling figures, each of said scaling figures having at least one edge opposing an edge of another said scaling figures, said scaling figures being disposed in said pattern means offset from a scaling figure having said opposing edge along an axis of alingment such that alignment of said opposing edge along said axis represents a measure of dimensional variation of said scaling figures.

22. The apparatus according to claim 21 wherein said alignment of said opposing edges along said axis represents a measure of dimensional variation resulting from the formation of said pattern means on said screen means.

23. The apparatus according to claim 21 wherein said alignment of said opposing edges along said axis represents a measure of dimensional variation resulting from either the formation of said pattern means on said screen means or the projection or printing of figures from said screen means onto another screen or wafer means.

* * * * *